(12) United States Patent
Fleischer et al.

(10) Patent No.: US 9,910,802 B2
(45) Date of Patent: *Mar. 6, 2018

(54) HIGH BANDWIDTH LOW LATENCY DATA EXCHANGE BETWEEN PROCESSING ELEMENTS

(71) Applicant: International Business Machines Corporation, Armonk, NY (US)

(72) Inventors: Bruce M. Fleischer, Bedford Hills, NY (US); Thomas W. Fox, Hopewell Junction, NY (US); Hans M. Jacobson, White Plains, NY (US); Ravi Nair, Briarcliff Manor, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 144 days.

This patent is subject to a terminal disclaimer.

(21) Appl. No.: 14/948,656

(22) Filed: Nov. 23, 2015

(65) Prior Publication Data

US 2016/0364364 A1    Dec. 15, 2016

Related U.S. Application Data

(63) Continuation of application No. 14/739,014, filed on Jun. 15, 2015.

(51) Int. Cl.
*G06F 13/00* (2006.01)
*G06F 13/362* (2006.01)
(Continued)

(52) U.S. Cl.
CPC .......... *G06F 13/362* (2013.01); *G06F 13/287* (2013.01); *G06F 13/4022* (2013.01);
(Continued)

(58) Field of Classification Search
USPC .................. 710/104–107, 110, 305–317; 709/201–203, 228–229, 231
See application file for complete search history.

(56) References Cited

U.S. PATENT DOCUMENTS 6,105,083 A * 8/2000 Kurtze ................ G06F 13/4213
375/E7.001
7,162,573 B2 * 1/2007 Mehta ................. G06F 15/8007
709/213

(Continued)

OTHER PUBLICATIONS

List of IBM Patents or Patent Applictions Treated As Related; (Appendix P), Filed Jan. 28, 2016, 2 pages.

(Continued)

*Primary Examiner* — Raymond Phan
(74) *Attorney, Agent, or Firm* — Cantor Colburn LLP

(57) ABSTRACT

Direct communication of data between processing elements is provided. An aspect includes sending, by a first processing element, data over an inter-processing element chaining bus. The data is destined for another processing element via a data exchange component that is coupled between the first processing element and a second processing element via a communication line disposed between corresponding multiplexors of the first processing element and the second processing element. A further aspect includes determining, by the data exchange component, whether the data has been received at the data exchange element. If so, an indicator is set in a register of the data exchange component and the data is forwarded to the other processing element. Setting the indicator causes the first processing element to stall. If the data has not been received, the other processing element is stalled while the data exchange component awaits receipt of the data.

6 Claims, 6 Drawing Sheets

(51) Int. Cl.
*G06F 13/40* (2006.01)
*G06F 13/28* (2006.01)
*G06F 13/42* (2006.01)
*G06F 15/173* (2006.01)

(52) U.S. Cl.
CPC ...... *G06F 13/4068* (2013.01); *G06F 13/4282* (2013.01); *G06F 15/17337* (2013.01)

(56) References Cited

U.S. PATENT DOCUMENTS

| | | | |
|---|---|---|---|
| 7,500,043 B2 * | 3/2009 | Wood | G06F 15/8007 370/464 |
| 7,788,465 B2 * | 8/2010 | Pires Dos Reis Moreira | G06F 9/30072 712/11 |
| 9,317,475 B2 * | 4/2016 | Tabaru | G06F 15/8007 |
| 2014/0115224 A1 * | 4/2014 | Sanghai | G06F 13/40 710/317 |

OTHER PUBLICATIONS

Bruce M. Fleischer et al., U.S. Appl. No. 14/739,014 entitled "Low Latency Data Exchange Between Processing Elements," filed with the U.S. Patent and Trademark Office dated Jun. 15, 2015.

* cited by examiner

HIGH BANDWIDTH LOW LATENCY DATA EXCHANGE BETWEEN PROCESSING ELEMENTS

DOMESTIC PRIORITY

This application is a continuation of U.S. patent application Ser. No. 14/739,014, filed Jun. 15, 2015, the content of which is incorporated by reference herein it its entirety.

BACKGROUND

The present invention relates generally to computer systems, and more particularly to low latency, high bandwidth local data exchange between processing elements in a computer system.

In computer systems with distributed execution of tasks transfer of data between processing elements in a computer system can affect system performance and latency. In systems including several levels of cache, a communication of data includes copying the data to each cache level as the data is transferred to or from different processing elements. Copying of data to each cache level can increase latency and power consumption in the computer system.

Oftentimes processing elements need high bandwidth low latency data exchange depending upon the operations being performed. For example, in order to perform efficient reductions of partial results or to reuse A-column data in a matrix multiply subroutine, a low latency, high bandwidth system is desired. In addition, operations such as passing along chained results for further processing in other processing elements can cause unwanted latency, as this often involves passing through several layers of cache.

SUMMARY

According to one embodiment, a method for exchanging data between processing elements of a computer system is provided. The method includes sending, by a first processing element, data over an inter-processing element chaining bus. The data is destined for another processing element via a data exchange register component that is coupled between the first processing element and a second processing element via a communication line disposed between corresponding multiplexors of the first processing element and the second processing element. The method also includes determining, by the data exchange component, whether the data has been received at the data exchange element. If the data has been received, the method includes setting an indicator bit in a register of the data exchange component and forwarding the data to the other processing element. Setting the indicator causes the first processing element to stall. If the data has not been received, the method includes stalling the other processing element while the data exchange component awaits receipt of the data

DETAILED DESCRIPTION

Figure 1:
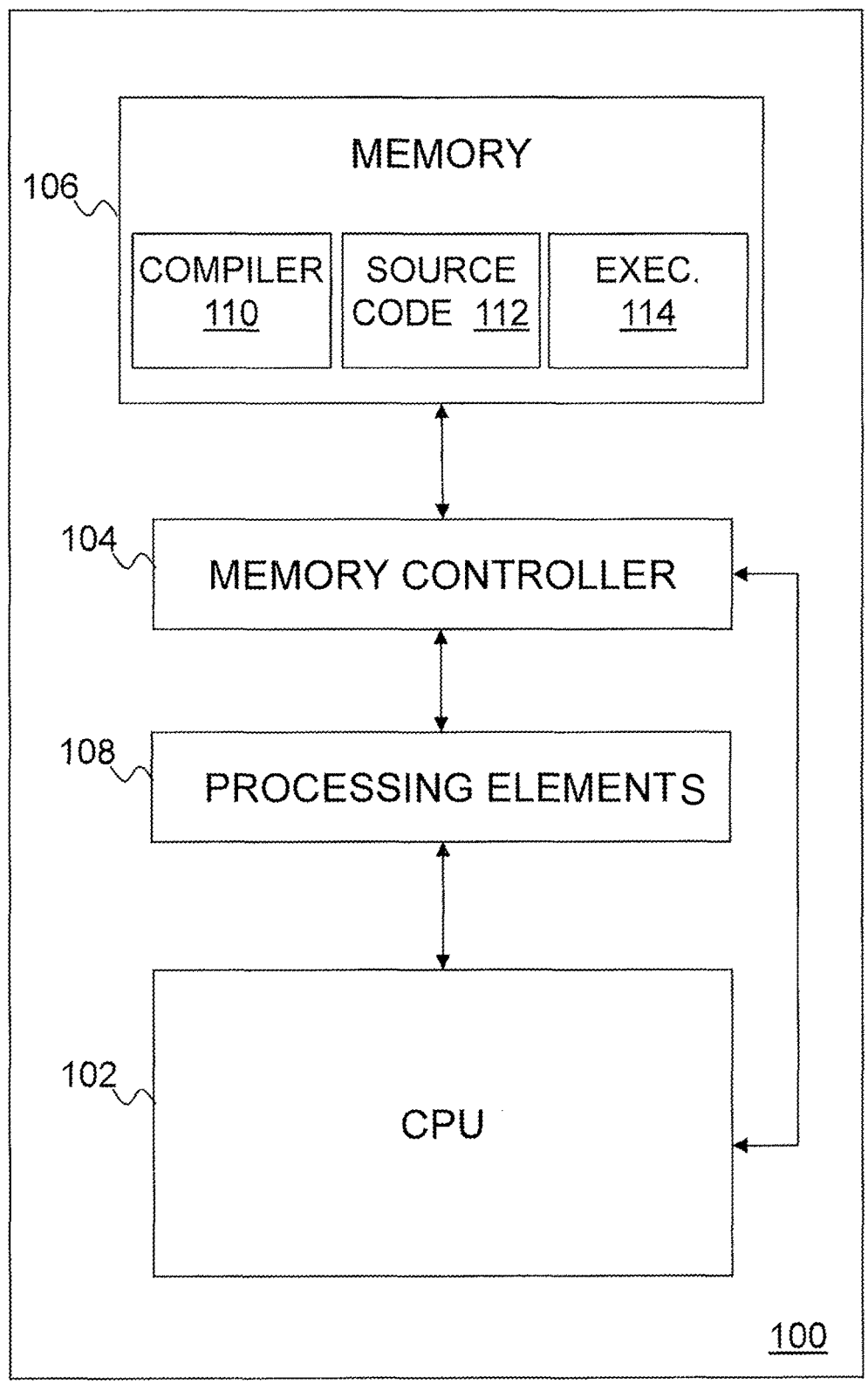
FIG. 1 illustrates a block diagram of a system for an active memory device in accordance with an embodiment.

Low latency, high bandwidth data exchange among processors is provided in accordance with embodiments. The data exchange processes are implemented by a system that employs an active memory device according to some embodiments. In particular, a compiler provides an executable module for execution on the system, where the executable module includes portions of code that may be executed on different processing elements in the system. As described herein, in some embodiments the portions of code may execute on a data exchange register component disposed between processing elements. In an embodiment, the compiler optimizes and organizes data exchanges in the computer system to improve efficiency during execution of the executable. The executable can coordinate data exchanges between processing elements in the active memory device to ensure that data is provided and available for execution of the code on the processing elements.

In embodiments, data is transferred directly between processing elements using an inter-processor connection network (where the communication path for the direct transfer does not include cache levels, thus reducing latency and saving power) and data exchange register component or between Processor Communication Units (PCUs) of the computer system using a crossbar network and queue residing within each PCU, as will be described herein. The method and system may be used to provide a value for a thread or to store a value from a thread, where the thread runs on the one of the processing elements. The communication of data may be between code running on a first processing element and the thread on a second processing element, where a queue in the processing element holds the value until code running on the processing element requires the value.

In another embodiment, code running on the processing element produces a result value that is placed in a queue in the processing element. A second processing element may then send a load request to read the result value from the queue, where the result may be used by code executing on a thread in the second processing element. These data exchanges are directly between a register in the second processing element and a queue in the first processing element, thus bypassing all system cache. In an embodiment, the communication path between the register and queue is a crossbar network linked to the processing elements of a single chip.

Providing direct exchange of data among processing elements using the data exchange register component and/or PCUs eliminates the need for shared Effective Address (EA) space or predetermined queue location among processing components.

An embodiment is directed to a computer system including a memory device, such as an active memory device or active buffered memory device. The memory device may be any suitable memory device including one or more memory device (e.g., random access memory "RAM" chips) connected to a hub chip (also referred to as a memory controller chip) configured to control the memory device. In an embodiment, the active memory device includes layers of memory that form a three dimensional ("3D") memory device (also referred to as "memory cube") where individual columns of memory chips form stacks or vaults in communication with the hub chip. In one embodiment, a plurality of memory stacks are located on a memory module, where each stack has a respective hub chip. The hub chips may include a processing element configured to communicate with the memory and other processing elements in other hub chips. In an embodiment, a processing element accesses a selected address in a vault through an interconnect network. In one embodiment, a plurality of memory devices, stacks and processing elements may communicate via the interconnect network, such as a crossbar switch. In embodiments, a memory stack includes multiple DRAM dies stacked together, where each DRAM die is divided into a number of banks. Further, in the example, a group of banks in each die, vertically aligned, may be referred to as a vault accessed by a vault controller.

Embodiments include a memory stack with a processing element and memory controller in the hub chip, referred to as an active memory device. The active memory device can perform a complex set of operations using multiple locations (e.g., data stored at specific addresses) within the memory device as operands. A process is provided whereby instructions and operations are performed autonomously on these operands within the memory device. Instructions and operations may be stored within the memory device itself and are not dispatched from a main processor, wherein the stored instructions are provided to the processing elements for processing by the processing element in the memory device. In one embodiment, the processing elements are programmable engines, comprising an instruction buffer, an instruction unit, including branching capability and instruction decode, a mixture of vector, scalar, and mask register files, a plurality of load/store units for the movement of data between memory and the register files, and a plurality of execution units for the arithmetic and logical processing of various data types. Also included in the memory device are address translation capabilities for converting or translating virtual addresses to physical addresses, a unified Load/Store Queue to sequence data movement between the memory and the processing elements, and a processor communications unit, for communication with the main processor.

In an embodiment, the active memory device is configured to load configuration information or instructions from a part of the active memory device into a processing element following receiving a command from an external requestor, such as a main processor or another processing element. In addition, the processing element may perform virtual-to-real address translations that it computes while executing the loaded instructions.

FIG. 1 illustrates a block diagram of a system with a memory device accordance with an embodiment. A system 100 depicted in FIG. 1 includes a computer processor 102, a memory 106 having memory devices, as well as a memory controller 104 and processing elements 108 for receiving data from the computer processor 102 to be stored in the memory 106. In an embodiment, the memory controller and processing element 108 may be referred to as a hub chip.

In one embodiment, the memory 106 and memory controller 104 is coupled to the computer processor 102 and processes write requests from the computer processor 102. In one example, the write requests contain data to be written to the memory 106 and a memory location of the instruction(s), where the instruction forms the virtual address for the data to be written. The memory controller 104 stores data at a real address within the memory 106. In another example, the computer processor 102 maps the virtual address to a real address in the memory 106 when storing or retrieving data. In the example, the write requests contain data to be written to the memory 106 and the real address identifying the location in the memory 106 to which the data will be written. The real address for a given logical address may change each time data in the memory 106 is modified.

In an embodiment, the command from the computer processor 106 specifies a sequence of instructions that include setup actions, execution actions and notification of completion actions. The setup actions may include configuration actions such as a command that loads configuration information from the memory within the memory device directly into the processing element 108. By providing the configuration information in the memory device, the processing element 108 is able to be properly configured after receiving a command. In an embodiment, configuration information may include information used to translate between virtual addresses and real addresses in the memory. Further, configuration information may include information to maintain coherence, by ensuring accuracy and consistency, of memory mapping and translation between the processing element and a requestor (e.g., main processor). The setup actions may also include the loading of code, such as a sequence of instructions, from the memory 106 into the processing elements 108. The execution actions include execution of the code that includes load, store, arithmetic/logical and other instructions.

In an additional mode of an embodiment, the processing elements 108 are coupled to the computer processor 102 and receive a command from the computer processor 102. The command corresponds to instructions stored in the memory to perform write requests for data to be written to the memory 106. In the embodiment, the instruction(s) executes and forms the virtual address corresponding to the write location in memory 106. The command may include a real address where the instruction(s) are stored. The memory controller 104 and/or processing elements 108 store data at a real address within the memory 106. In an embodiment, a processing element 108 maps the virtual address to a real address in the memory 106 when storing or retrieving data. The real address for a given logical address may change each time data in the memory 106 is modified. The computer processor 102 provides commands to the memory 106, where the processing element 108 receives the command and fetches corresponding instructions from the memory.

The system 100 is one example of a configuration that may be utilized to perform the processing described herein. Although the system 100 has been depicted with only a single memory 106, memory controller 104, and computer processor 102, it will be understood that other embodiments would also operate in other systems with two or more of the memory 106, memory controller 104, or computer processor 102. In addition, as described herein portions of the processing described herein may span one or more of the memory 106, memory controller 104, processing elements 108 and computer processor 102.

The memory 106 may store one or more separate programs, each of which comprises an ordered listing of executable instructions for implementing logical functions. For example, software stored in the memory 106 may include an operating system (not shown), source code 112, and one or more applications. As shown in FIG. 1, the memory 106 stores source code 112 and a compiler 110. The compiler 110 may alternatively be stored and executed on a system that is external to the system 100 for which it produces executable programs, such as executable 114. The compiler 110 includes numerous functional components for implementing the features, processes, methods, functions, and operations of the exemplary embodiments, as will be described further herein. Optimized code is executed in a runtime environment (not shown) of the system 100.

The applications may include a source code 112, executable program (object code), script, or any other entity comprising a set of instructions to be performed. When the application is source code 112, the program code is translated via the compiler 110 to the executable 114.

Figure 2:
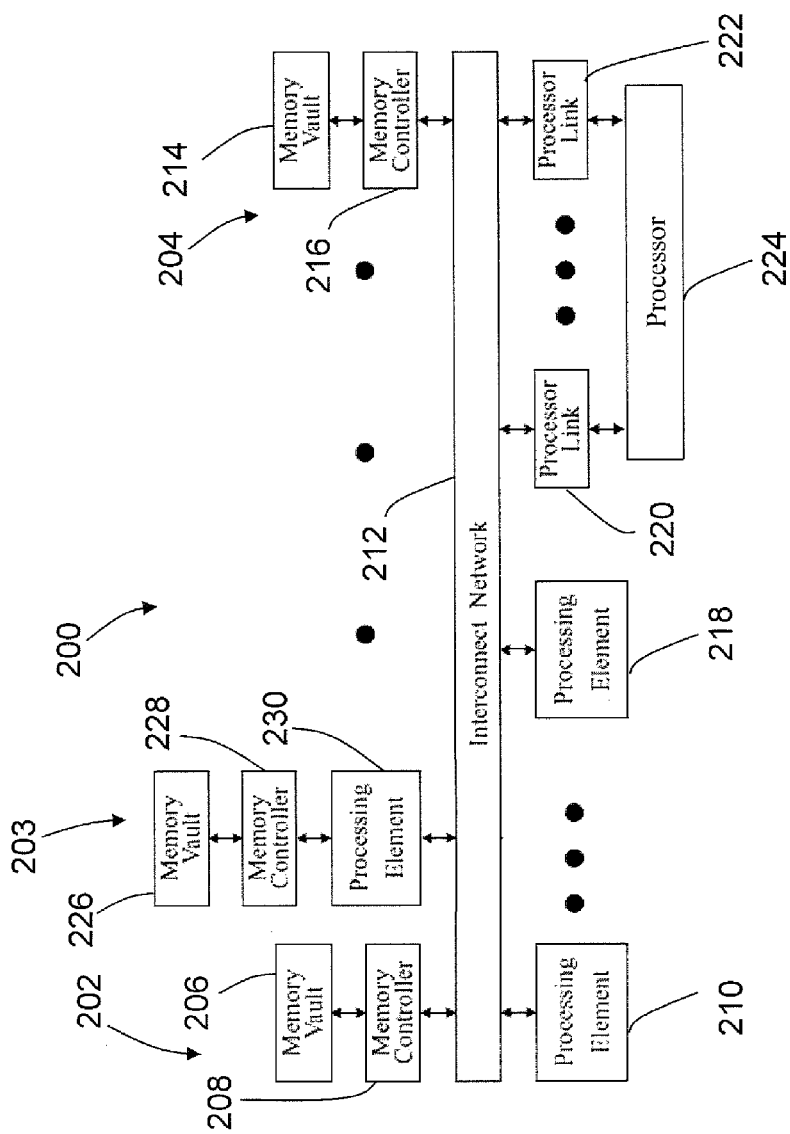
FIG. 2 illustrates a block diagram of a system with an active memory device in accordance with an embodiment.

FIG. 2 is a schematic diagram of an embodiment of a computer system 200 implementing low latency data exchange between processing elements. In one embodiment, the computer system 200 includes an active memory device 202, an active memory device 203 and an active memory device 204. The active memory device 202 includes a memory vault 206, a memory controller 208 and a processing element 210. In an embodiment, the processing element 210, memory vault 206 and memory controller 208 are coupled and communicate via an interconnect network 212. Specifically, the processing element 210 communicates to the memory vault 206, memory controller 208 and other memory devices, such as active memory devices 203 and 204, via the interconnect network 212. The interconnect network 212 is also coupled to a main processor 224 by processor links 220 and 222. The interconnect network 212 provides a fast and high bandwidth path for communication between portions of the device, such processing elements, memory controllers and memory, to provide improved performance and reduced latency for the active memory.

The active memory device 203 includes a memory vault 226, a memory controller 228 and a processing element 230. In an embodiment, the processing element 230, memory vault 226 and memory controller 228 are all located on the same side of the interconnect network 212, such as within a single stack. By positioning the processing element 230 in the same stack as memory vault 226, the latency is reduced when accessing locations in the memory vault 226, thus further improving performance. In one embodiment, the active memory 204 includes a memory vault 214 and memory controller 216 coupled to processing elements 210 and processing element 218 via the interconnect network 212. As depicted, the processing element 218 is located on the other side of the interconnect network 212 from the memory controller 216 and memory vault 214. In embodiments, the active memory devices 202, 203 and 204 include multiple layers of stacked addressable memory elements. Further, the stack's memory may be divided into memory vaults 206, 226 and 214, or three-dimensional blocked regions of the memory device which share a common memory controller and/or memory element, and are capable of servicing memory access requests to their domain of memory independently of one another.

In embodiments, the processing elements, memory vaults and memory controllers may be arranged in a suitable manner depending on the application. For example, one or more processing elements, such as processing element 218, may be positioned on one side of the interconnect network 212 and may operate as a pool of processing elements that are available for accessing any memory in the memory system coupled to the interconnect network 212. The pooled processing elements are not limited to accessing a particular memory vault and, thus, one or more elements may be utilized upon receiving a command from the main processor 224. Accordingly, processing element 218 may be configured to access each memory vault 206, 226 and 214. In another embodiment, one or more processing elements, such as processing element 230, is located as part of a stack including a memory vault 226 and memory controller 228. In such a configuration, the processing element 230 is configured to access memory vault 226 coupled to the interconnect network 212, including memory vaults 206 and 214. In one embodiment, one or more processing element, such as processing element 210, is positioned on an opposite side of the interconnect network 212 from the memory vault 206 and memory controller 208. In the configuration, the processing element 210 is configured to access any memory coupled to the interconnect network 212, including memory vaults 226 and 214.

Figure 3:
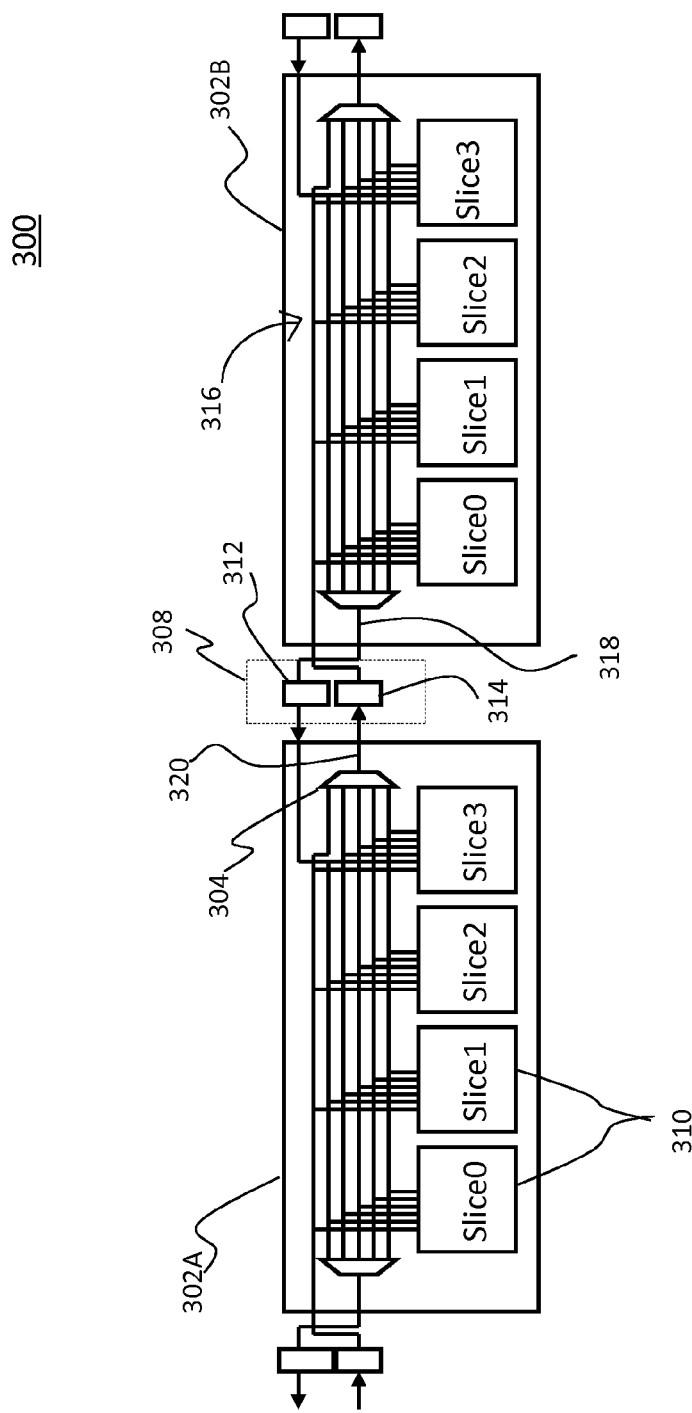
FIG. 3 is a block diagram of a portion of a computer system for performing low latency data exchange according to an embodiment.

FIG. 3 is a block diagram of a portion of a chip 300 illustrating two processing elements 302A-302B each containing four compute slices 310 where each slice consists of an arithmetic-logic unit (ALU), load-store unit (LSU) and register files (RF). The processing elements 302A-302B are coupled via an inter-processing element chaining bus 316 that includes data lines connecting corresponding processing element slices 310 to a multiplexor 304 disposed at each processing element 302A-302B. The processing elements 302A-302B are communicatively coupled to a data exchange register component 308 via data lines 318 and 320 disposed between multiplexors 304 and the data exchange register component 308. In an embodiment, inter-processing element data lines can be made addressable, via an instruction (e.g., processing element instruction buffer), as read or write ports.

The data exchange element 308 may be implemented as a register configured with indicator bit designator fields 312 and 314. If the processing of data exchange is performed by the data exchange register component 308, the component 308 may include some processing capability (e.g., hardware/software). Otherwise, if the data exchange processing is not performed at the data exchange register component 308, the component 308 may be configured without processing capabilities. In this second embodiment, the processing may be implemented through code executing on a corresponding processing element 302.

When a first processing element 302A sends data to a second processing element 302B, an indicator bit is set (e.g., "1") in indicator register 314. Likewise, when the second processing element 302B sends data to the first processing element 302A, an indicator bit is set in indicator register 314. These features are described further herein.

Figure 4:
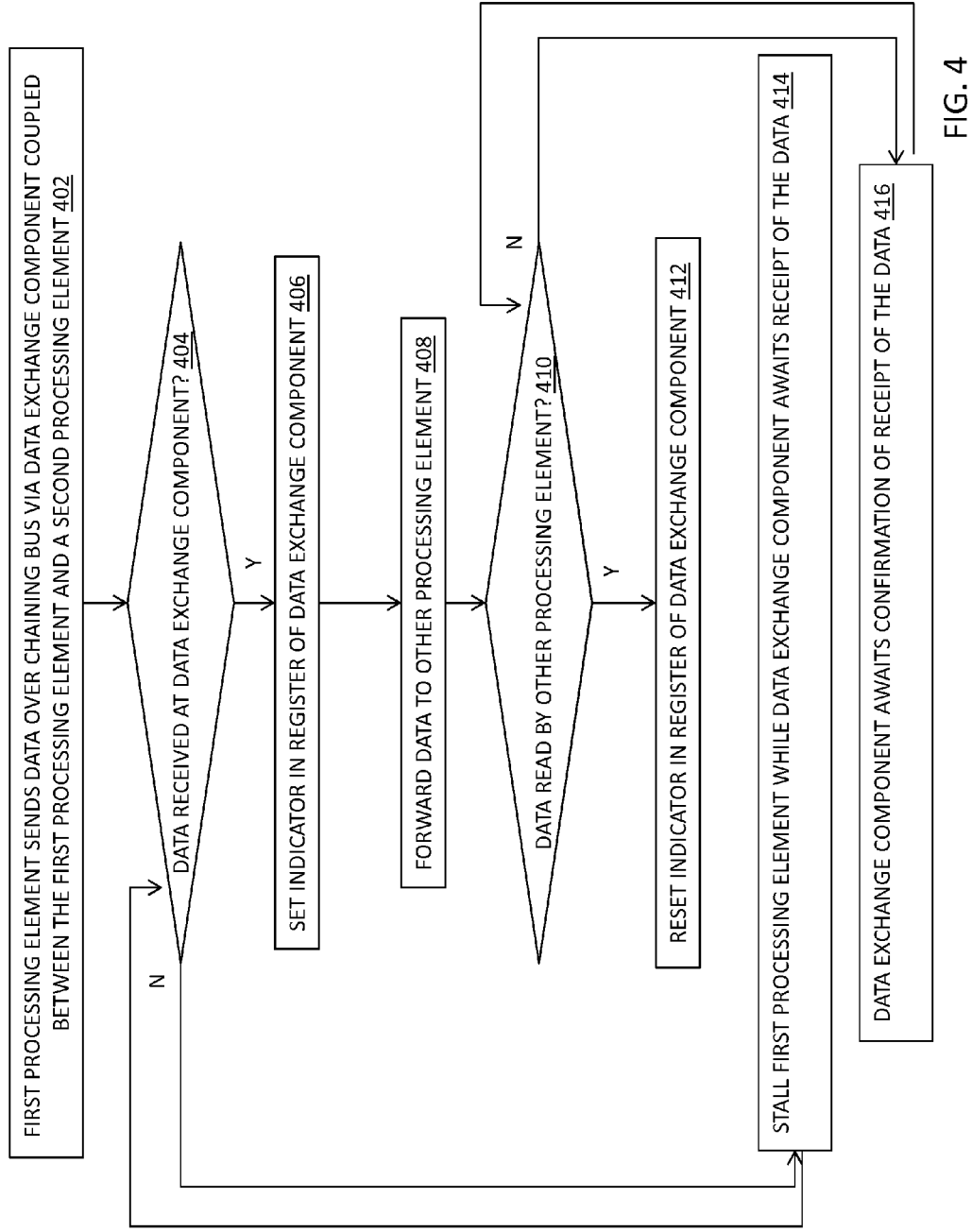
FIG. 4 is a flow diagram of a process for performing low latency data exchange according to the computer system of FIG. 3.

FIG. 4 is a flow diagram of a processing for low latency data exchange between processing elements according to the embodiment depicted in FIG. 3. In an embodiment, the data exchanged between processing elements 302A and 302B can be implemented for data exchanged between registers of the processing elements 302A and 302B (not shown). The registers may include, e.g., register files (RFs) and arithmetic logic units (ALUs). In this example, the data exchange can occur between, e.g., RF-ALU, RF-RF, ALU-RF, and ALU-ALU.

At block 402, a first processing element 302A sends data over the inter-processing element chaining bus 316. The data is addressed for transmission to another processing element and is transmitted over the data line 320 via the multiplexor 304 of processing element 302A. As shown in FIG. 3, the data line 320 couples the inter-processing element chaining bus 316 (through the multiplexor 304 of processing element 302A) to the data exchange register component 308, which is disposed between the processing elements 302A and 302B.

At block 404, the data exchange component 308 determines whether the data from the processing element 302A has been received at the data exchange component. If so, the data exchange component 308 sets an indicator bit in the register 314 of the data exchange component at block 406 and forwards the data to the other processing element 302B at block 408. If the indicator bit in register 314 is already set the first processing element 302A is configured to stall until the previous data exchange has completed and the indicator bit has been reset.

At block 404, if the data exchange component 308 determines that the data from the processing element 302A has not been received at the data exchange component, the data exchange component 308 causes the first processing element 302A to stall while the data exchange component 308 awaits receipt of the data at block 414. The process returns to block 404.

At block 410, the data exchange component 308 determines whether the data has been read by the second processing element 302B. The determination may be implemented through a confirmation communication from the second processing element 302B to the data exchange register component 308. If the data has been read, the data exchange component 308 resets the indicator bit in the register 314 at block 412.

At block 410, if the data exchange component 308 determines that the data has not been read by the second processing element 302B, the data exchange component awaits confirmation from the second processing element 302B that the data has been read at block 416. The process returns to block 410. If, after a defined metric, e.g., amount of time waiting, it is still determined that the data has not been read by the second processing element 302B, the first processing element 302A may be configured to re-send the data, in which case the process returns to block 402.

In an embodiment, it is possible that the data is destined for a processing element that is non-contiguously located with respect to the first processing element 302A. In this instance, the data may be transmitted along with a hop indicator. For example, the data may be transmitted by the first processing element 302A with a hop indicator such that the data is routed from the first processing element 302A over the inter-processor element chaining bus 316 via multiple data exchange components 308 to the destination processing element. In an embodiment, data destined for a processing element can be routed from one processing element to the next via a relative hop indicator (x,y), which reflects the number of hops to the destination processing element. In this manner, data is valid for a receiving processing element only when the hop indicator reaches (0,0).

Figure 5:
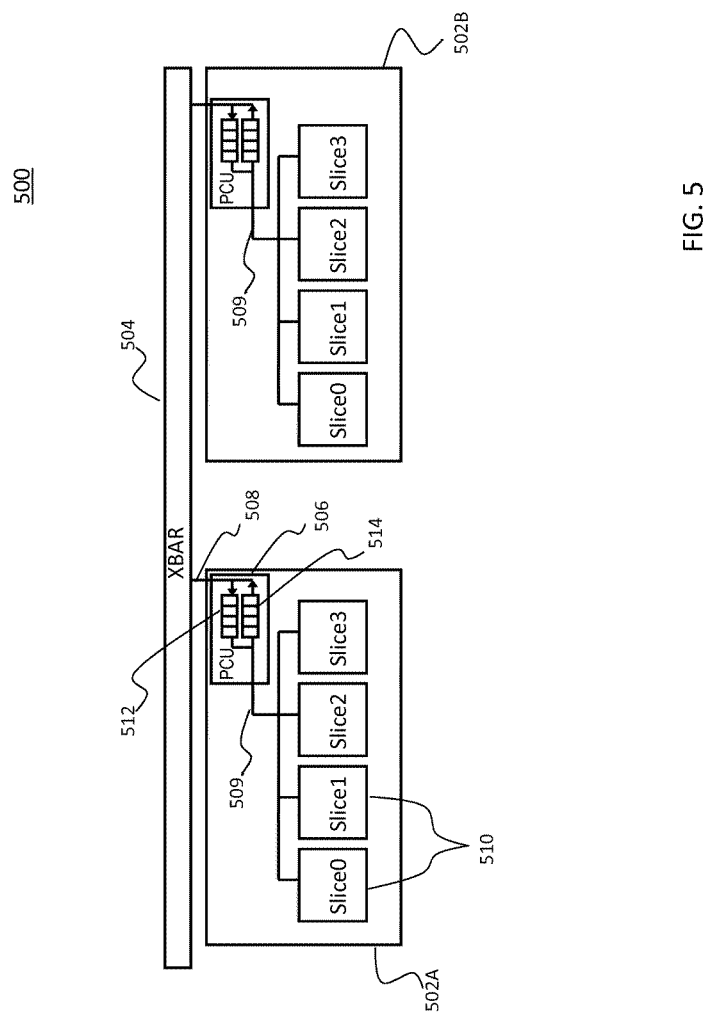
FIG. 5 is a block diagram of a portion of a computer system for performing low latency data exchange according to another embodiment.

FIG. 5 is a block diagram of a portion of a chip 500 according to another embodiment. The chip 500 illustrates two processing elements 502A and 502B that are interconnected by corresponding Processor Communication Units (PCUs) 506 and data lines 508 that couple the PCUs 506 to a cross-bar interconnect network 504, and data lines 509 that couple the PCUs 506 to individual processing element slices 510.

Each of the PCUs 506 in respective processing elements 502A-502B includes a sending queue 512 and a receiving queue 514. Data transmitted from processing element 502A is received by sending queue 514 and forwarded over the network 504 to a destination processing element. Likewise, data received from the network 504 that is destined for processing element 502A is held in receiving queue 512 before being forwarded onto a processing element slice 510.

In an embodiment, a first processing element 502A sends data to a second processing element 502B using a push protocol for the request, where the data is pulled from a receiving queue 512 in the second processing element 502B. In one embodiment, the network 504 a crossbar switch, and the network detects the specified address and routes the load request to the second processing element 502B instead of a memory controller in the device. Further, a plurality of load requests may be queued up in the second processing element 502B until the data for each request has been computed by code running on the second processing element 502B. To simplify the synchronization of the data exchange, the association between requested and result data is provided by the ordering of received requests and, thus, is dependent on a predetermined program execution on the first and second processing elements. The ordering and predetermined program execution is provided by the compiler in the executable module. The data exchange is synchronized in that the requester (e.g., either processing element) gets the data it expects in response to an appropriate request, where multiple requests are provided the correct corresponding data in the proper order. Synchronization is also provided by producing code that is performed on each of the processing elements from source code from an executable module based on an application. Thus, a compiler coordinates the data distribution and execution during compiling of the application into an executable module.

Figure 6:
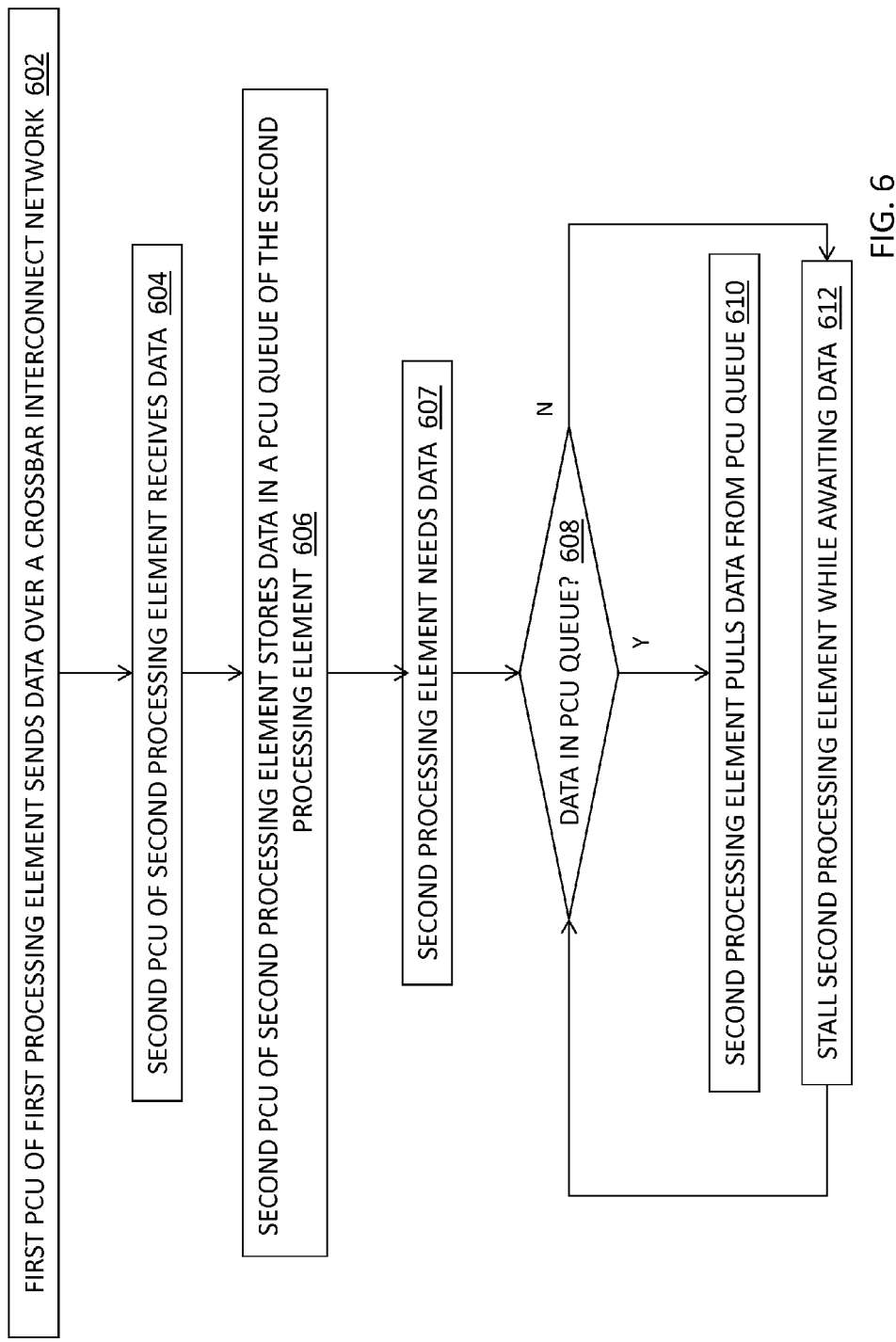
FIG. 6 is a flow diagram of a process for performing low latency data exchange according to the computer system of FIG. 5.

FIG. 6 is a flow diagram of a process for implementing low latency data exchange according to the embodiment shown in FIG. 5. A first PCU 506 of processing element 502A receives data from the processing element 502A for transmission over the network 504. The data is placed in the sending queue 514 of processing element 502A. The PCU 506 of the processing element 502A forwards the data over the network 504 to a second processing element 502B at block 602, and the data is received at the receiving processing element 502B at block 604. The PCU 506 of the second processing element 502B stores the data in its receiving queue 512 at block 606.

At block 607, the second processing element needs the data. At block 608, the second processing element's 502B PCU 506 determines whether the data exists in the receiving queue 512 of processing element 502B. If so, the second processing element 502B pulls the data from the queue 512 at block 610. Otherwise, if the data does not exist in the receiving queue 512 of processing element 502B, the second processing element 502B stalls while it awaits the data from the first processing element 502A at block 612.

Technical effects provide low latency data exchange among processing elements. Processing elements can be interconnected using a chaining bus, multiplexors, and data exchange register components, which eliminates the need for a shared EA space.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for direct communication of data between processing elements, the method comprising:
  sending, by a first processing element, data over an inter-processing element chaining bus, the data destined for another processing element via a data exchange register component that is coupled between the first processing element and a second processing element via a communication line disposed between corresponding multiplexors of the first processing element and the second processing element, wherein the data is exchanged between register files (RFs) and arithmetic logic units (ALUs) of the processing elements;

determining, by the data exchange component, whether the data has been received at the data exchange element;

if the data has been received, setting an indicator bit in a register of the data exchange component and forwarding the data to the other processing element; and if the data has not been received, stalling the first processing element while the data exchange component awaits receipt of the data.

2. The method of claim 1, wherein upon receipt of the data at the other processing element, the data exchange component resets the indicator.

3. The method of claim 1, wherein the other processing element is the second processing element.

4. The method of claim 1, wherein the other processing element is non-contiguously coupled to the first processing element, the method further comprising:

sending, with the data from the first processing element, a hop indicator such that the data is routed from the first processing element over the inter-processor element chaining bus via multiple data exchange components to the other processing element.

5. The method of claim 1, wherein the data exchange is between:

ALU to ALU;
RF to RF;
RF to ALU; and
ALU to RF.

6. The method of claim 2, wherein the data exchange component comprises a first register associated with data received from the first processing element, and a second register associated with data received from the second processing element.

* * * * *